United States Patent
Yu et al.

(10) Patent No.: US 11,328,221 B2
(45) Date of Patent: May 10, 2022

(54) HYBRID MODEL FOR SHORT TEXT CLASSIFICATION WITH IMBALANCED DATA

(71) Applicant: International Business Machines Corporation, Armonk, NY (US)

(72) Inventors: Yang Yu, Acton, MA (US); Ming Tan, Malden, MA (US); Ravi Nair, Briarcliff Manor, NY (US); Haoyu Wang, Somerville, MA (US); Saloni Potdar, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 683 days.

(21) Appl. No.: 16/379,192

(22) Filed: Apr. 9, 2019

(65) Prior Publication Data

US 2020/0327445 A1 Oct. 15, 2020

(51) Int. Cl.
*G06F 15/16* (2006.01)
*G06N 20/00* (2019.01)
*G06F 16/35* (2019.01)

(52) U.S. Cl.
CPC ........... *G06N 20/00* (2019.01); *G06F 16/353* (2019.01)

(58) Field of Classification Search
CPC .............................. G06N 20/00; G06F 16/353
USPC ........................................................ 709/200
See application file for complete search history.

(56) References Cited

U.S. PATENT DOCUMENTS

| 9,836,450 | B2 | 12/2017 | Erle et al. | |
|---|---|---|---|---|
| 10,937,416 | B2* | 3/2021 | Tan | G10L 15/16 |
| 2016/0071022 | A1 | 3/2016 | Bruno et al. | |
| 2019/0325029 | A1* | 10/2019 | Gandhi | G06F 40/284 |
| 2019/0370341 | A1* | 12/2019 | Jiang | G06F 40/284 |
| 2020/0250274 | A1* | 8/2020 | Tan | G06N 20/00 |
| 2020/0251100 | A1* | 8/2020 | Tan | G06N 3/0454 |

FOREIGN PATENT DOCUMENTS

| CN | 107491782 A | 12/2017 |
|---|---|---|
| CN | 108108351 A | 6/2018 |
| CN | 108197109 A | 6/2018 |

OTHER PUBLICATIONS

Anonymous, "Cascade deep learning model training for visual analytics", IP.com No. IPCOM000245969D; IP.com Electronic Publication Date: Apr. 21, 2016.

(Continued)

*Primary Examiner* — Moustafa M Meky
(74) *Attorney, Agent, or Firm* — Stephanie L. Carusillo

(57) ABSTRACT

A method of text classification includes generating a text embedding vector representing a text sample and applying weights of a regression layer to the text embedding vector to generate a first data model output vector. The method also includes generating a plurality of prototype embedding vectors associated with a respective classification labels and comparing the plurality of prototype embedding vectors to the text embedding vector to generate a second data model output vector. The method further includes assigning a particular classification label to the text sample based on the first data model output vector, the second data model output vector, and one or more weighting values.

20 Claims, 7 Drawing Sheets

(56) References Cited

OTHER PUBLICATIONS

Anonymous, "Semi-Supervised Classification Using Object Metadata", IP.com No. IPCOM000252345D; IP.com Electronic Publication Date: Jan. 5, 2018.
Anonymous, "Weighting Knowledge Sources to Facilitate User Input", IP.com No. IPCOM000252352D; IP.com Electronic Publication Date: Jan. 5, 2018.
Ganganwar, Vaishali, "An overview of classification algorithms for imbalanced datasets", International Journal of Emerging Technology and Advanced Engineering; Website: www.ijetae.com (ISSN 2250-2459, vol. 2, Issue 4, Apr. 2012).
Ravi, Sachin, et al., "Optimization as a Model for Few-Shot Learning", Published as a conference paper at ICLR 2017.
Snell, Jake, et al., "Prototypical Networks for Few-shot Learning", 31st Conference on Neural Information Processing Systems (NIPS 2017), Long Beach, CA, USA.
Vinyals, Oriol, et al., "Matching Networks for One Shot Learning", arXiv:1606.04080v2 [cs.LG] Dec. 29, 2017.
Yan, Yilin, "Deep Learning Based Imbalanced Data Classification and Information Retrieval for Multimedia Big Data", Open Access Dissertations. 2145; https://scholarlyrepository.miami.edu/oa_dissertations/2145, Jul. 31, 2018.
Yu, Mo, et al., "Robust Task Clustering for Deep and Diverse Multi-Task and Few-Shot Learning", arXiv:1708.07918v2 [cs.LG] May 18, 2018.

* cited by examiner

HYBRID MODEL FOR SHORT TEXT CLASSIFICATION WITH IMBALANCED DATA

BACKGROUND

The present disclosure relates to computer-implemented classification of text.

Deep learning techniques have been used to generate text classifiers, e.g., for chatbots or other purposes. Generally, to achieve desired accuracy, a deep learning model is trained iteratively using a large set of labeled text samples. However, in many practical cases, only a small amount of labeled data is available per-class. For example, when a company offers a new conversational service, it is usually not feasible for the company to collect a large number of examples for each class. Accordingly, in such cases, the company may resort to manually generating training data (e.g., by manually labeling intent classification) which is a very time-consuming process.

SUMMARY

According to a particular aspect, a computer-implemented method of assigning classification labels to text includes generating, using embedding layers of a trained classification network, a text embedding vector representing a text sample and applying weights of a regression layer of the trained classification network to the text embedding vector to generate a first data model output vector. Each value of the first data model output vector is representative of a first estimate of a probability that the text sample is associated with a class indicated by a respective classification label of a plurality of classification labels. The method also includes generating, based on training text samples associated with the plurality of classification labels, a plurality of prototype embedding vectors. Each prototype embedding vector of the plurality of prototype embedding vectors is associated with a respective classification label. The method further includes comparing the plurality of prototype embedding vectors to the text embedding vector to generate a second data model output vector. Each value of the second data model output vector is representative of a second estimate of the probability that the text sample is associated with the class. The method also includes assigning a particular classification label of the plurality of classification labels to the text sample based on the first data model output vector, the second data model output vector, and one or more weighting values.

According to another aspect, a system for assigning classification labels to text includes one or more processors and one or more memory devices coupled to the one or more processors. The one or more memory devices store instructions that are executable by the one or more processors to perform operations including using embedding layers of a trained classification network to generate a text embedding vector representing a text sample. The operations also include applying weights of a regression layer of the trained classification network to the text embedding vector to generate a first data model output vector. Each value of the first data model output vector is representative of a first estimate of a probability that the text sample is associated with a class indicated by a respective classification label of a plurality of classification labels. The operations further include generating, based on training text samples associated with the plurality of classification labels, a plurality of prototype embedding vectors. Each prototype embedding vector of the plurality of prototype embedding vectors is associated with a respective classification label. The operations also include comparing the plurality of prototype embedding vectors to the text embedding vector to generate a second data model output vector. Each value of the second data model output vector is representative of a second estimate of the probability that the text sample is associated with the class. The operations further include assigning a particular classification label of the plurality of classification labels to the text sample based on the first data model output vector, the second data model output vector, and one or more weighting values.

According to another aspect, a computer program product for assigning classification labels to text includes a computer readable storage medium having program instructions embodied therewith. The program instructions are executable by one or more processors to perform operations including generating, using embedding layers of a trained classification network, a text embedding vector representing a text sample and applying weights of a regression layer of the trained classification network to the text embedding vector to generate a first data model output vector. Each value of the first data model output vector is representative of a first estimate of a probability that the text sample is associated with a class indicated by a respective classification label of a plurality of classification labels. The operations also include generating, based on training text samples associated with the plurality of classification labels, a plurality of prototype embedding vectors. Each prototype embedding vector of the plurality of prototype embedding vectors is associated with a respective classification label. The operations further include comparing the plurality of prototype embedding vectors to the text embedding vector to generate a second data model output vector. Each value of the second data model output vector is representative of a second estimate of the probability that the text sample is associated with the class. The operations also include assigning a particular classification label of the plurality of classification labels to the text sample based on the first data model output vector, the second data model output vector, and one or more weighting values.

DETAILED DESCRIPTION

Figure 1:
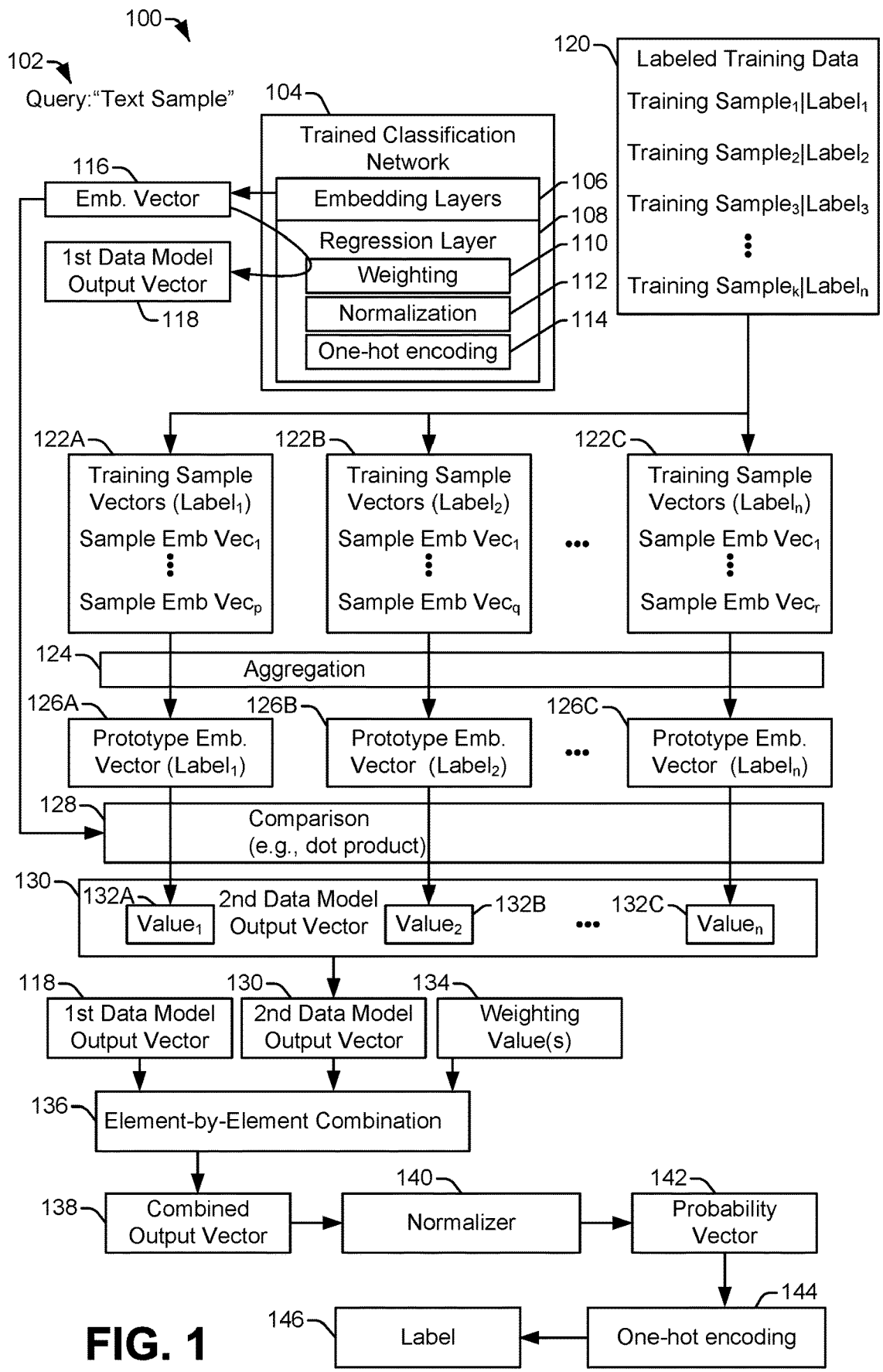
FIG. 1 is a diagram that illustrates an example of a system for assigning classification labels to text according to a particular aspect of the present disclosure.

Systems, methods, and computer-program products disclosed herein facilitate computer-implemented assignment of classification labels to text. The present disclosure provides a general framework for text classification that dynamically combines deep-learning-based text-classification models and matching-network-based text-classification models. A deep-learning-based text-classification model can be trained to provide reliable (e.g., accurate) text classification if a sufficiently large training data set can be used to train the model. The training data set should include many training text samples per class. In contrast, a matching-network-based text-classification model can provide classification results with fewer training samples per class, but the classification results generated by the model may be less reliable than results provided by a suitably trained deep-learning-based text-classification model. The disclosed embodiments combined aspects of deep-learning-based text-classification models and matching-network-based text-classification models to generate reliable classification results based on a less than ideal training data set.

A matching-network-based text-classification model generates an output by comparing a text sample to representative samples from each of a set of classes. The comparison is performed in an embedding space using an embedding vector to represent the text sample and one embedding vector to represent each sample. In some implementations, each class is represented by a single sample. In other implementations, several representative samples for a class are used to generate a prototype sample that is used to represent the class. For example, a prototype vector for a particular class can represent an aggregation or average of sentential embeddings of randomly-selected (or pseudo-randomly-selected) training samples associated with the particular class.

In embodiments disclosed herein, a deep-learning-based text-classification model is used to generate an embedding vector representing a text sample that is to be classified. The embedding vector representing the text sample is combined (e.g., via a dot product operation) with weighting values (of an output layer of the deep-learning-based text-classification model) associated with each class to generate a first set of values (e.g., one value per class). Together, the first set of values corresponds to a first output vector of the deep-learning-based text-classification model. Unlike traditional deep-learning-based text classification, the first output vector is not subjected to normalization and one-hot encoding. Thus, the first output vector does not directly indicate a classification label (as would be the case after one-hot encoding) and does not directly indicate probability associated with a particular classification label since values of the first output vector are not necessarily within the range zero (0) to one (1) (as would be the case after normalization). However, a first output vector value associated with a particular class is representative of a first estimate of a probability that the text sample is associated with the particular class.

The embedding vector representing the text sample is also combined (e.g., via a dot product operation) with each of the embedding vectors representing prototype vectors to generate a second value for each class of the set of classes. Each of the second values is representative of a second estimate of a probability that the text sample is associated with the particular class. Together, the second values correspond to a second output vector of the matching-network-based text-classification model.

Values of the first output vector are combined with values of the second output vector (element by element) to generate a combined output vector. In some implementations, weighted values of the first and second output vectors are used to generate the combined output vector. Weighting values used to combine the first and second output vectors can be user specified or automatically determined (e.g., using another machine learning model or using a calculated or predetermined parameter). For example, the weighting values can be determined based on the text sample and the training samples used to generate the prototype vectors.

Each values of the combined output vector is representative of a combined estimate of a probability that the text sample is associated with the particular class. The combined output vector can be further processed, such as via normalization and one-hot encoding, to determine a classification result indicating a classification label assigned to the text sample.

By combining output of a matching-network-based text-classification model and a deep-learning-based text-classification model, the disclosed embodiments are able to provide reliable classification results for classes that have few samples (referred to herein as "few-shot classes") and for classes that have many samples (referred to herein as "many-shot classes"). Further, the disclosed embodiments are able to provide reliable classification results when available training data is imbalanced such that some classes are many-shot classes and others are few-shot classes.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, multiple training sample vectors are illustrated and associated with reference numbers 122A, 122B, and 122C. When referring to a particular one of these training sample vectors, such as the training sample vectors 122A, the distinguishing letter "A" is used. However, when referring to any arbitrary one of these training sample vectors or to these training sample vectors as a group, the reference number 122 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise.

Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating", "calculating", "using", "selecting", "accessing", and "determining" are interchangeable unless context indicates otherwise. For example, "generating", "calculating", or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 is a diagram that illustrates an example a text classification system 100 for assigning classification labels to text according to a particular aspect of the present disclosure. In FIG. 1, the text classification system 100 is illustrated as a set of functional blocks and data. Each of the functional blocks represents a related set of operations that are performed by software executing at one or more processors or are performed by special purpose hardware. To illustrate, the text classification system 100 includes an aggregation block 124, which can include instructions executable by one or more processors, can include special purpose hardware (e.g., an application-specific integrated circuit), or can include a combination thereof.

In FIG. 1, the text classification system 100 includes a trained classification network 104 or portions thereof. The trained classification network 104 is an artificial neural network text classifier that is trained using labeled training data (e.g., the labeled training data 120 or other labeled training data). For example, the trained classification network 104 can include or correspond to a convolutional neural network/recurrent neural network with max pooling, though other neural network architectures can be used. The text classification system 100 includes an embedding network, including embedding layers 106 of the trained classification network 104, and a regression layer 108. In FIG. 1, the regression layer 108 includes instructions and parameters for performing operations including weighting 110, normalization 112, and one-hot encoding 114. In some implementations, the normalization 112 and one-hot encoding 114 operations of the trained classification network 104 are used during training of the trained classification network 104, but are not used by the text classification system 100 during runtime to assign a label to a particular text sample.

In FIG. 1, the text classification system 100 also includes the aggregation block 124, a comparison block 128, an element-by-element combination block 136, a normalizer block 140, and a one-hot encoding block 144. Operation of each of these blocks is described further below.

The text classification system 100 is configured to receive a query 102 that includes a text sample to be labeled. For example, the text classification system 100 can be part of a chatbot system that applies intent labels to text received from users. As explained above, neural networks can be used to label text, e.g., with intent labels, but gathering enough labeled training data to train a reliable and accurate neural network classifier can be time consuming and expensive. Accordingly, the text classification system 100 uses a combined approach in which results from a multi-shot technique (e.g., the trained classification network 104) and results from a few-shot technique (e.g., a prototype network) are combined to label the text sample.

Before operation of the text classification system 100, a classification network is trained, using a supervised training process, to generate the trained classification network 104. In some implementations, the classification network is trained using domain specific training text samples. For example, a business or other entity preparing to offer a chatbot service can provide labeled text samples that are relevant to the chatbot service, and the classification network can be trained using the labeled text samples. In some implementations, the classification network can be trained using non-domain specific training text samples. For example, the classification network can be trained using text and labels from an encyclopedia database (e.g., the Wikipedia website's database (Wikipedia is a registered trademark of the Wikimedia Foundation, Inc.) or another public or private set of labeled text samples. In still other implementations, the classification network can be trained using both domain specific training text samples and non-domain specific training text samples. For example, the classification network can be trained using the non-domain specific training text and then further refined by training with the domain specific training text.

The labeled training data 120 in FIG. 1 includes at least domain specific training text samples. For example, the labeled training data 120 includes one or more training samples assigned to each class that the text classification system 100 can recognize. To illustrate in FIG. 1, the labeled training data 120 includes Training Sample$_1$ which is assigned to a class corresponding to (e.g., identified by) Label$_1$, Training Sample$_2$ which is assigned to a class corresponding to Label$_2$, Training Sample$_3$ which is assigned to a class corresponding to Label$_3$, and Training Sample$_k$ which is assigned to a class corresponding to Label$_n$. Although four labels are illustrated in FIG. 1, the labeled training data 120 can include more than four or fewer than four labels corresponding to more than four or fewer than four classes. For example, the labeled training data 120 can correspond to n labels, where n is any positive integer greater than one. Similarly, although four training samples are illustrated in FIG. 1, the labeled training data 120 can include more than four or fewer than four training samples as long as the number of training samples is at least equal to the number of classes. For example, the labeled training data can include k training samples, where k is any positive integer greater than or equal to n. Generally, the labeled training data 120 will include more than one training sample per label. For example, $Label_1$ can be the same as the $Label_2$ even if Training $Sample_1$ is different from Training $Sample_2$. In some circumstances, a single training sample can be associated with more than one label. For example, Training $Sample_1$ can be the same as Training $Sample_2$ even if $Label_1$ is different from $Label_2$.

After a classification network is trained to generate the trained classification network 104, the training samples of the labeled training data 120 are provided as input to the embedding layers 106 to generate training sample vectors 122. The training sample vectors 122 are embedding vectors representing the training samples. For illustration, the training sample vectors 122 in FIG. 1 include training sample vectors 122A (i.e., Sample Embedding $Vector_1$ through Sample Embedding $Vector_p$) representing training samples associated with a class corresponding to $Label_1$, include training sample vectors 122B (i.e., Sample Embedding $Vector_1$ though Sample Embedding $Vector_q$) representing training samples associated with a class corresponding to $Label_2$, and include training sample vectors 122C (i.e., Sample Embedding $Vector_1$ though Sample Embedding $Vector_r$) representing training samples associated with a class corresponding to $Label_q$. Although each set of training sample vectors 122 in FIG. 1 is illustrated as including two or more sample embedding vectors, in some circumstances, one or more of the sets of training sample vectors 122 can include only one sample embedding vector.

In some circumstances, the labeled training data 120 includes more training samples for one class than for another class. For example, the labeled training data 120 may include hundreds or thousands of training samples for a first class and only a few training samples for a second class. In such circumstances, the specific training samples selected to form the training samples vectors 122 for each class can be selected randomly or pseudo-randomly from among the training samples of the class. For example, the labeled training data 120 can include a large number of training samples for the class identified by $Label_1$ and a small number of training samples for the class identified by $Label_2$. In this example, all of the training samples for the class identified by $Label_2$ can be used to form the training sample vectors 122B and only a randomly or pseudo-randomly selected subset of the training samples for the class identified by $Label_1$ can be used to form the training sample vectors 122A. Selecting only a subset of the training samples for a particular class can be used to even out the number of sample embedding vectors in each set of training sample vectors 122.

The training sample vectors 122 can be processed by the aggregation block 124 to form prototype embedding vectors 126. Each prototype embedding vector 126 represents a single class and corresponding label. For example, in FIG. 1, a prototype embedding vector 126A represents the class corresponding to $Label_1$, a prototype embedding vector 126B represents the class corresponding to $Label_2$, and a prototype embedding vector 126C represents the class corresponding to $Label_n$. The aggregation block 124 forms a prototype embedding vector 126 for each class based on the sample embedding vectors associated with the class. To illustrate, the aggregation block 124 may mathematically combine the sample embedding vectors of the training sample vectors 122A to form the prototype embedding vector 126A.

In a particular implementation, the aggregation block 124 mathematically combines the sample embedding vectors by determining an element-by-element average (e.g., mean, mode, or median) value of the sample embedding vectors. "Element-by-element" means that each value of a vector is combined with a corresponding value of one or more other vectors. To illustrate, if the sample embedding vectors each include three values (corresponding to a first value of a first element, a second value of a second element, and a third value of a third element), the aggregation block 124 aggregates (e.g., averages) first values of the training sample embedding vectors 122A to determine the first value of the prototype embedding vector 126A. Likewise in this illustrative example, the aggregation block 124 aggregates (e.g., averages) second values of the training sample embedding vectors 122A to determine the second value of the prototype embedding vector 126A, and the aggregation block 124 aggregates (e.g., averages) third values of the training sample embedding vectors 122A to determine the third value of the prototype embedding vector 126A.

In some implementations, the prototype embedding vectors 126 are determined before the query 102 is received. For example, the prototype embedding vectors 126 can be determined as part of setting up and configuring the text classification system 100. In other implementations, the prototype embedding vectors 126 are determined at runtime, such as in response to receiving the query 102.

During operation of the text classification system 100, the text classification system 100 receives the query 102 including a text sample to be labeled. For example, the query can be received via a chatbot application, and the label can include an intent label to facilitate routing a user to an appropriate information resource.

The text sample is provided as input to the embedding layers 106 to generate an embedding vector 116 representing the text sample. Further, weights of the weighting operation 110 of the regression layer 108 can be applied to the embedding vector 116 to generate a first data model output vector 118. The first data model output vector 118 includes a plurality of values, and each value of the first data model output vector 118 is representative of a first estimate of a probability that the text sample is associated with a class indicated by a respective classification label of a plurality of classification labels. In a particular implementation, the first data model output vector 118 is not subjected to normalization 112 at this stage; thus, while the values are representative of or indicative of probability estimates, the values of the first data model output vector 118 are not necessarily confined to values between zero (0) and one (1).

In FIG. 1, the comparison block 128 determines values of a second data model output vector 130 by comparing the embedding vector 116 representing the text sample and each of the prototype embedding vectors 126. For example, the comparison block 128 determines a dot product of the embedding vector 116 representing the text sample and the prototype embedding vector 126A to determine a first value 132A ($Value_1$) corresponding to the class associated with the $Label_1$. In this example, the comparison block 128 determines a dot product of the embedding vector 116 representing the text sample and the prototype embedding vector 126B to determine a second value 132B ($Value_2$) corresponding to the class associated with the $Label_2$ and determines a dot product of the embedding vector 116 representing the text sample and the prototype embedding vector 126C to determine an Nth value 132C (Value$_1$) corresponding to the class associated with the Label$_n$. Together, the values 132 correspond to the second data model output vector 130. Each value 132 of the second data model output vector 130 is representative of a second estimate of the probability that the text sample is associated with the class.

The element-by-element combination block 136 combines, element by element, the first data model output vector 118, the second data model output vector 130, and one or more weighting values 134 to form a combined output vector 138. As an example, the element-by-element combination block 136 combines the first data model output vector 118, the second data model output vector 130, and the one or more weighting values 134 according to the following equation:

$$\text{Comb\_value}_i = \text{Weight}_i \times \text{1stVec\_value}_i + (1-\text{Weight}_i) \times \text{2ndVec\_value}_i$$

where Comb_value$_i$ is the value of the ith element of the combined output vector 138, 1stVec_value$_i$ is the value of the ith element of the first data model output vector 118, 2ndVec_value$_i$ is the value of the ith element of the second data model output vector 130, and Weight$_i$ is the weighting value 134 associated with the class corresponding to the ith element of each of the combined output vector 138. In some implementations, the same weighting value 134 is used for all of the elements of the combined output vector 138. For example, a weighting value 134 of 0.5 can be used to evenly weight the first data model output vector 118 and the second data model output vector 130 to determine the combined output vector 138. As another example, the weighting value 134 can be a predetermined parameter assigned by a user based on experience or empirical results.

In some implementations, the weighting value 134 associated with one class (e.g., the class identified by Label$_1$) is different from the weighting value 134 associated with another class (e.g., the class identified by Label$_2$). Because each element of the combined output vector 138 corresponds to one class, in such implementations, Weight$_i$ can have different values for each element of the element-by-element combination operation. For example, a machine learning model, such as a neural network, can be trained to determine a weighting value 134 for each element based on the text sample, based on the training samples used to generate the prototype vectors, or both. As another example, the weighting value 134 for a particular class can be selected based on a distance, in embedding space, between the text sample and the prototype embedding vector 126 for the particular class, or based on a representative distance (e.g., an average, a minimum, or a maximum distance) between the text sample and the training sample vectors 122 for the particular class. To illustrate, if the distance, in embedding space, between the text sample and the prototype embedding vector 126 for the particular class or the representative distance between the text sample and the training sample vectors 122 for the particular class is relative small, a weighting value 134 that emphasizes (i.e., puts more weight on) a value from the second data model output vector 130 can be used. Conversely, if the distance between the text sample and the prototype embedding vector 126 for the particular class or the representative distance between the text sample and the training sample vectors 122 for the particular class is relatively large, a weighting value 134 that emphasizes (i.e., puts more weight on) the value from the first data model output vector 118 can be used.

Each value of the combined output vector 138 is representative of an estimate of a probability that the text sample is associated with a class indicated by a respective classification label of a plurality of classification labels. In some implementations, the combined output vector 138 can be normalized (e.g., by the normalizer block 140) to generate a probability vector 142. The values of the combined output vector 138 do not necessarily all fall within a range from zero (0) to one (1); however, the normalization operations performed by the normalizer block 140 generate probability values within the range from zero (0) to one (1). Thus, each element of the probability vector 142 is a probability estimate (e.g., between zero and one) indicating the probability that that text sample is associated with a class corresponding to the element.

In some implementations, the probability vector 142 is used to generate an output, such as an ordered list of labels based on the probability that the text sample is associated with each of the labels. In some implementations, the probability vector 142 is provided as input to the one-hot encoding block 144, which generates an output indicating a single label (e.g., label 146) to be assigned to the text sample.

By determining the label 146 to assign to the text sample using output from a matching-network-based text-classification model (e.g., the second data model output vector 130) in combination with output from a deep-learning-based text-classification model (e.g., the first data model output vector 118), the text classification system 100 is able to provide reliable classification results for few-shot classes and many-shot classes. Further, the text classification system 100 is able to provide reliable classification results when available training data is imbalanced such that some classes are many-shot classes and others are few-shot classes.

Figure 2:
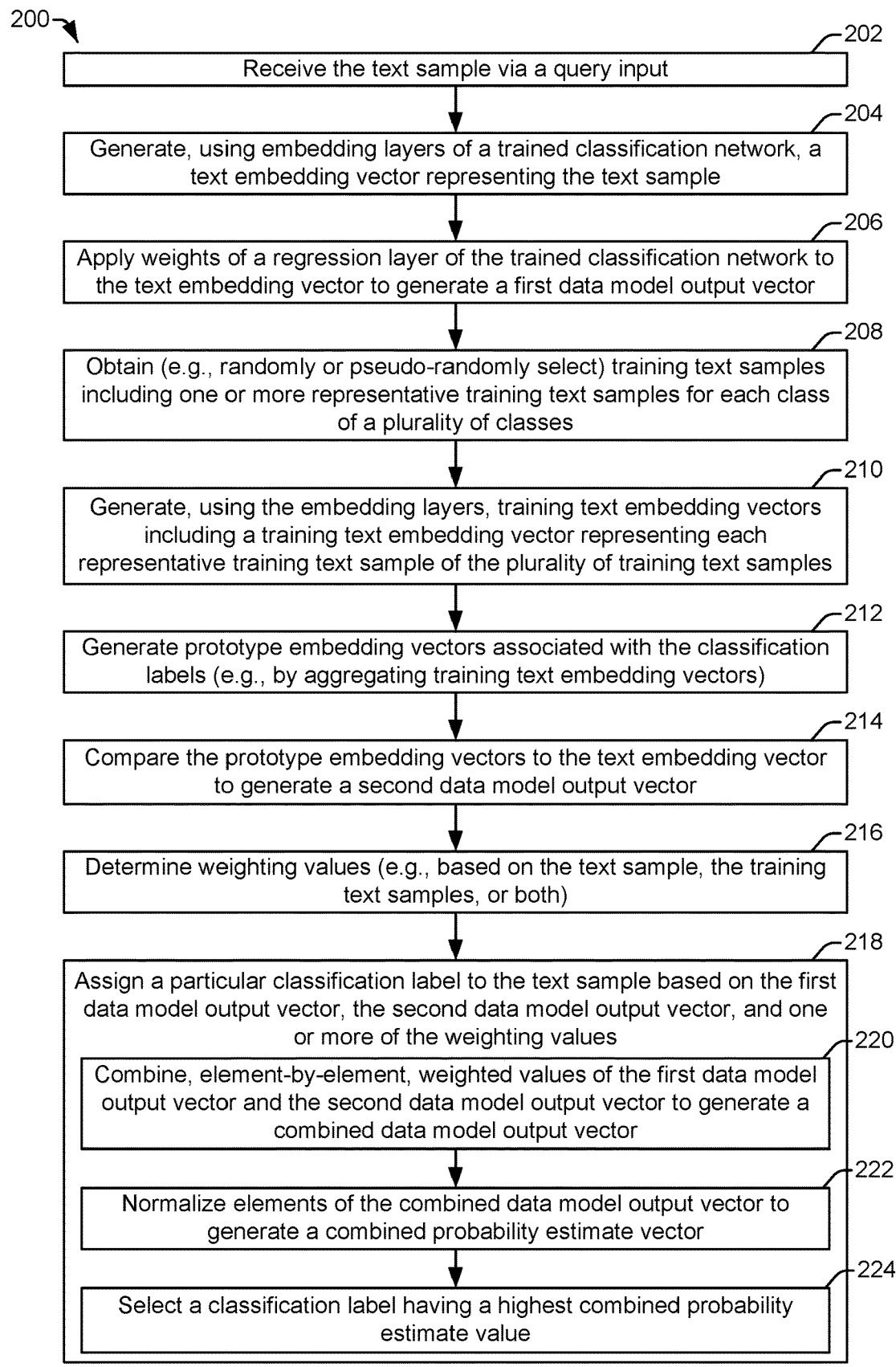
FIG. 2 is a flowchart that illustrates an example of a computer-implemented method of assigning classification labels to text according to a particular aspect of the present disclosure.

FIG. 2 is a flowchart that illustrates an example of a computer-implemented method 200 of assigning classification labels to text according to a particular aspect of the present disclosure. The method 200 can be performed by a computing device, such as a computing device 702 of FIG. 7. In some implementations, software (e.g., a set of instructions) that are executable to perform text classification according to the method 200 can be distributed to customer computer or servers as described with reference to FIG. 3, or can be executed on-demand as described with reference to FIG. 4. In some implementations, the software (e.g., the set of instructions) to perform text classification according to the method 200 can be executed in a cloud computing environment as described with reference to FIGS. 5 and 6.

The method 200 includes the text classification system 100 receiving a text sample via a query input, at 202. For example, a user can input a sentence or phrase that is to be assigned a label indicating an intent of the user.

The method 200 includes, at 204, generating a text embedding vector representing the text sample. The text embedding vector is generated using embedding layers of a trained classification network. For example, the embedding layers 106 of the trained classification network 104 of FIG. 1 can generate the text embedding vector (e.g., the embedding vector 116) representing the text sample.

The method 200 also includes, at 206, applying weights of a regression layer of the trained classification network to the text embedding vector to generate a first data model output vector, where each value of the first data model output vector is representative of a first estimate of a probability that the text sample is associated with a class indicated by a respective classification label of a plurality of classification labels. For example, the weights of the weighting operation 110 of the regression layer 108 are applied to the embedding vector 116 to generate the first data model output vector 118 of FIG. 1.

In the particular implementation illustrated in FIG. 2, the method 200 includes, at 208, obtaining a plurality of training text samples including one or more representative training text samples for each class of a plurality of classes. For example, training text samples representing each class of the plurality of classes may be randomly or pseudo-randomly selected from a subset of the labeled training data 120 representing the corresponding class. In the particular implementation illustrated in FIG. 2, the method 200 also includes, at 210, generating a plurality of training text embedding vectors (e.g., the training sample vectors 122 of FIG. 1) including a training text embedding vector representing each representative training text sample of the plurality of training text samples. The plurality of training text embedding vectors is generated using the embedding layers of the trained classification network.

The method 200 also includes, at 212, generating, based on training text samples associated with the plurality of classification labels, a plurality of prototype embedding vectors. Each prototype embedding vector of the plurality of prototype embedding vectors is associated with a respective classification label. For example, a prototype embedding vector 126 corresponding to a particular class of a plurality of classes can be generated by aggregating a set of training text embedding vectors (e.g., two or more sample embedding vectors of the training sample vectors 122 of FIG. 1) corresponding to the particular class. In some implementations, the training text embedding vectors, the prototype embedding vectors, or both, are generated during setup or configuration operations (e.g., before the query input is received).

The method 200 also includes, at 214, comparing the plurality of prototype embedding vectors to the text embedding vector to generate a second data model output vector. Each value of the second data model output vector is representative of a second estimate of the probability that the text sample is associated with a corresponding class. For example, the comparison block 128 of FIG. 1 can compare a prototype embedding vector 126 and the embedding vector 116 by computing a dot product of the two vectors. The result of the dot product computation is a representative of a second estimate of the probability that the text sample is associated with a class corresponding to the prototype embedding vector 126.

In the particular implementation illustrated in FIG. 2, the method 200 also includes, at 216, determining, based on the text sample and the plurality of training text samples, a plurality of weighting values including the one or more weighting values 134. As explained with reference to FIG. 1, the weighting values 134 can be predetermined, user configured, calculated, or determined using a machine learning model, such as a neural network. In some implementations, the weighting values 134 are determined based on the text sample, based on the training text samples, or based on both the text sample and the training text samples.

The method 200 also includes, at 218, assigning a particular classification label of the plurality of classification labels to the text sample based on the first data model output vector, the second data model output vector, and one or more weighting values. For example, the label 146 can be assigned to the text sample based on the first data model output vector 118, the second data model output vector 130, and the weight values 134 of FIG. 1. In the particular implementation illustrated in FIG. 2, assigning the particular classification label includes, at 220, combining, element by element, weighted values of the first data model output vector and the second data model output vector to generate a combined data model output vector, and at 222, normalizing elements of the combined data model output vector to generate a combined probability estimate vector including a plurality of probability estimate elements. Each probability estimate elements is associated with a respective classification label of the plurality of classification labels. In the particular implementation illustrated in FIG. 2, assigning the particular classification label also includes, at 224, selecting a classification label having a highest combined probability estimate value. For example, in FIG. 1, the combined output vector 138 is normalized by the normalizer block 140 to generate the probability vector 142. The one-hot encoding block 144 generates a one-hot encoded vector in which the label 146 is indicated based on a probability value associated with the label 146 being highest among the probability values of the probability vector 142.

Figure 3:
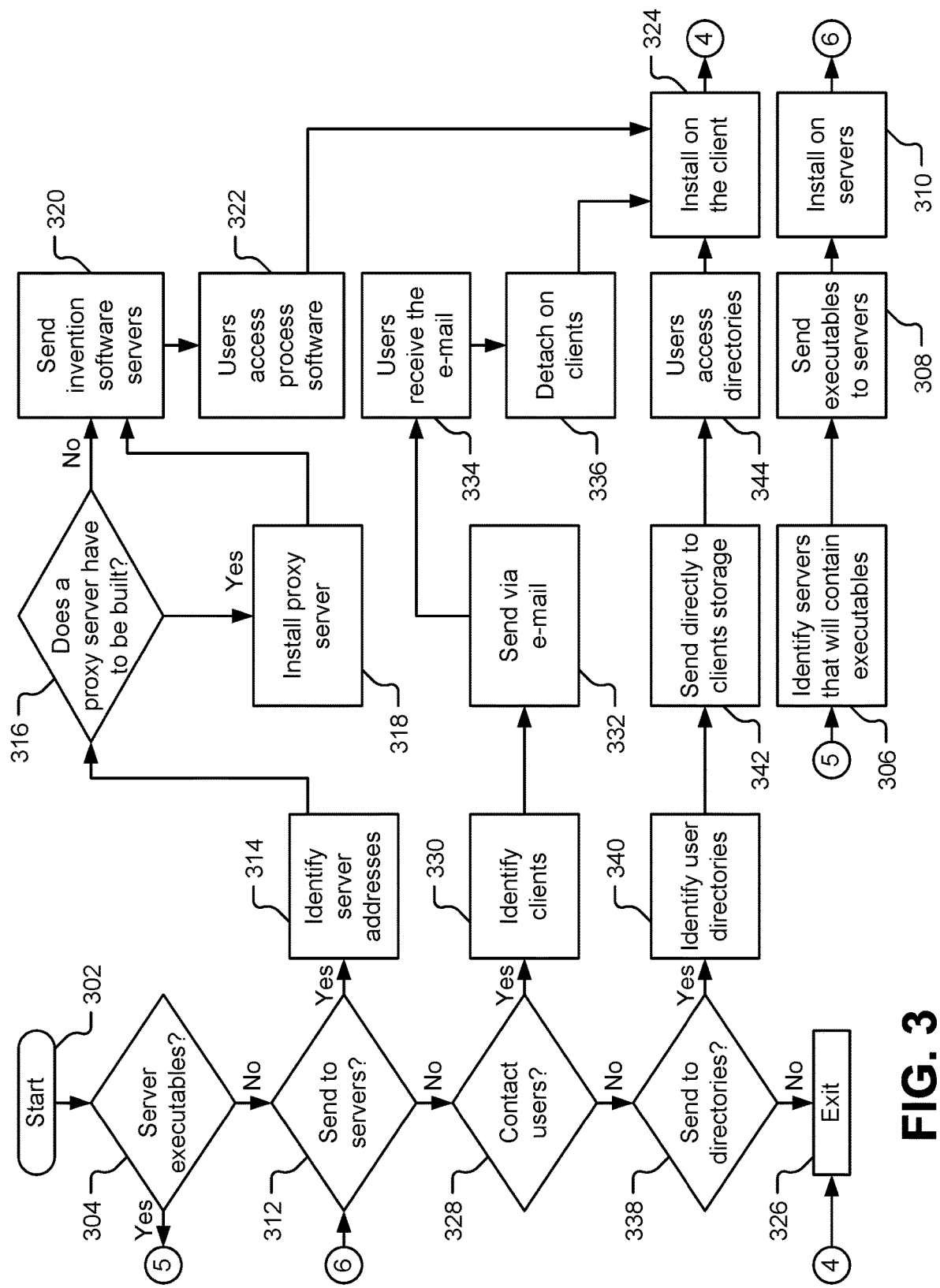
FIG. 3 is a flowchart that illustrates an example of a method of deploying software for assigning classification labels to text according to a particular aspect of the present disclosure.

FIG. 3 is a flowchart that illustrates an example of a method of deploying software for computer-implemented text classification according to a particular aspect of the present disclosure. While it is understood that process software for text classification may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Step 302 begins the deployment of the process software. An initial step is to determine if there are any programs that will reside on a server or servers when the process software is executed (304). If this is the case, then the servers that will contain the executables are identified (306). The process software for the server or servers is transferred directly to the servers' storage via FTP or some other protocol or by copying though the use of a shared file system (308). The process software is then installed on the servers (310).

Next, a determination is made on whether the process software is to be deployed by having users access the process software on a server or servers (312). If the users are to access the process software on servers, then the server addresses that will store the process software are identified (314).

A determination is made if a proxy server is to be built (316) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (318). The process software is sent to the (one or more) servers either via a protocol such as FTP, or it is copied directly from the source files to the server files via file sharing (320). Another embodiment involves sending a transaction to the (one or more) servers that contained the process software, and have the server process the transaction and then receive and copy the process software to the server's file system. Once the process software is stored at the servers, the users via their client computers then access the process software on the servers and copy to their client computers file systems (322). Another embodiment is to have the servers automatically copy the process software to each client and then run the installation program for the process software at each client computer. The user executes the program that installs the process software on his client computer (324) and then exits the process (326).

In step 328 a determination is made whether the process software is to be deployed by sending the process software to users via e-mail. The set of users where the process software will be deployed are identified together with the addresses of the user client computers (330). The process software is sent (332) via e-mail to each of the users' client computers. The users then receive the e-mail (334) and then detach the process software from the e-mail to a directory on their client computers (336). The user executes the program that installs the process software on his client computer (324) and then exits the process (326).

Lastly, a determination is made on whether the process software will be sent directly to user directories on their client computers (338). If so, the user directories are identified (340). The process software is transferred directly to the user's client computer directory (342). This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the process software (344). The user executes the program that installs the process software on his client computer (324) and then exits the process (326).

Figure 4:
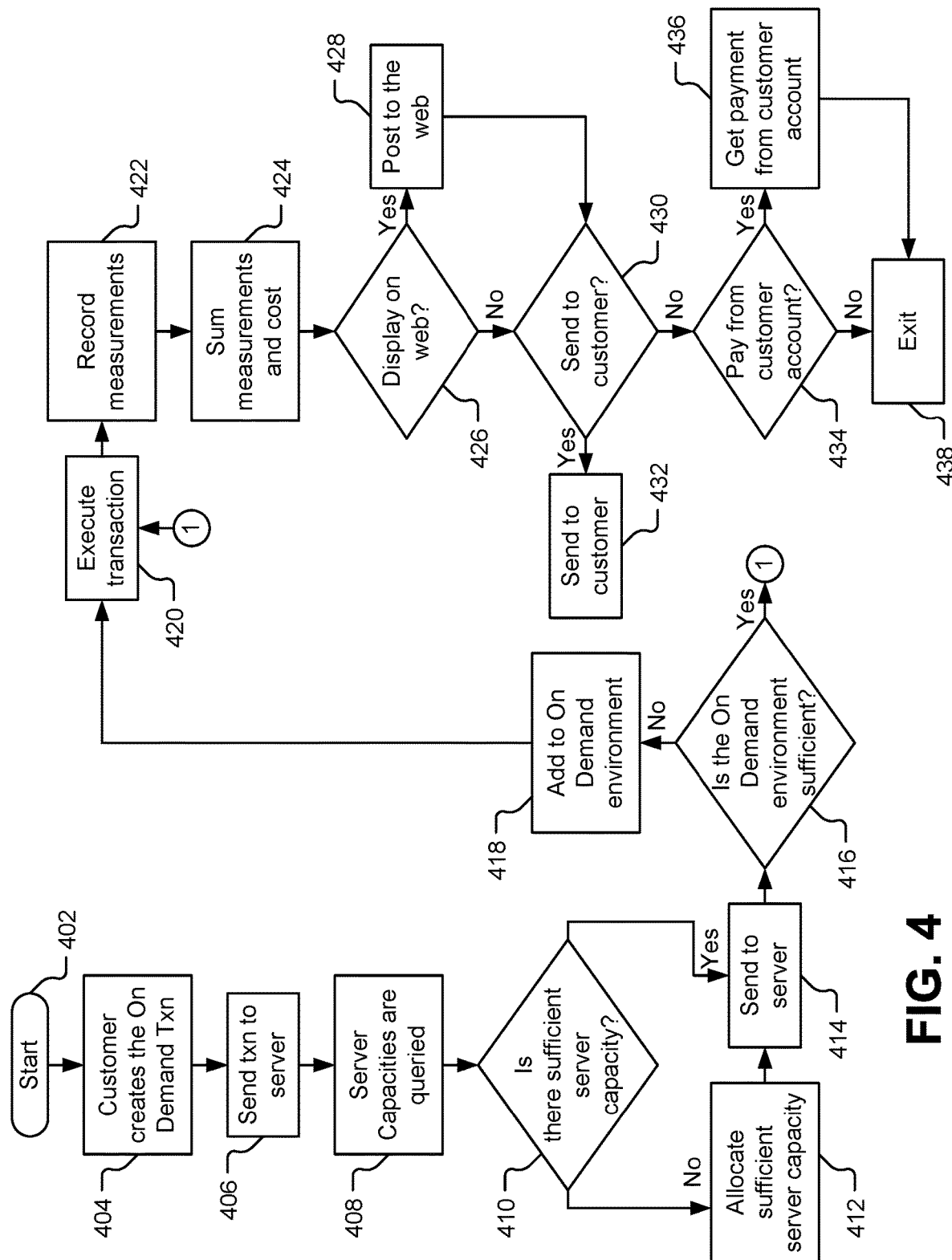
FIG. 4 is a flowchart that illustrates an example of a method of assigning classification labels to text in an on demand context according to a particular aspect of the present disclosure.

FIG. 4 is a flowchart that illustrates an example of a method of using computer-implemented text classification in an on demand context according to a particular aspect of the present disclosure. In FIG. 4, the process software for computer-implemented text classification is shared, simultaneously serving multiple customers in a flexible, automated fashion. It is standardized, requiring little customization, and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time, such as minutes, seconds, and hours, on the central processor of the server. Additionally, the accessed server may make requests of other servers that require CPU units. CPU units are an example that represents but one measurement of use. Other measurements of use include, but are not limited to, network bandwidth, memory usage, storage usage, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use, such as network bandwidth, memory usage, storage usage, etc., approach a capacity so as to affect performance, additional network bandwidth, memory usage, storage, etc. are added to share the workload.

The measurements of use employed for each service and customer are sent to a collecting server that sums the measurements of use for each customer for each service that was processed anywhere in the network of servers that provide the shared execution of the process software. The summed measurements of use units are periodically multiplied by unit costs, and the resulting total process software application service costs are alternatively sent to the customer and/or indicated on a web site accessed by the customer, who may then remit payment to the service provider. The measurements of use can also be used to determine voting weight values.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Step 402 begins the On Demand process. A transaction is created that contains the unique customer identification, the requested service type, and any service parameters that further specify the type of service (404). The transaction is then sent to the main server (406). In an On Demand environment, the main server can initially be the only server, and then as capacity is consumed other servers are added to the On Demand environment.

The server central processing unit (CPU) capacities in the On Demand environment are queried (408). The CPU requirement of the transaction is estimated, and then the server's available CPU capacity in the On Demand environment is compared to the transaction CPU requirement to see if there is sufficient CPU available capacity in any server to process the transaction (410). If there is not sufficient server CPU available capacity, then additional server CPU capacity is allocated to process the transaction (412). If there was already sufficient available CPU capacity, then the transaction is sent to a selected server (414).

Before executing the transaction, a check is made of the remaining On Demand environment to determine if the environment has sufficient available capacity for processing the transaction. This environment capacity consists of such things as, but not limited to, network bandwidth, processor memory, storage etc. (416). If there is not sufficient available capacity, then capacity will be added to the On Demand environment (418). Next the required software to process the transaction is accessed, loaded into memory, and then the transaction is executed (420).

The usage measurements are recorded (422). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs, and then recorded as a charge to the requesting customer (424).

If the customer has requested that the On Demand costs be posted to a web site (426), then they are posted thereto (428). If the customer has requested that the On Demand costs be sent via e-mail to a customer address (430), then they are sent (432). If the customer has requested that the On Demand costs be paid directly from a customer account (434), then payment is received directly from the customer account (436). On Demand process proceeds to 438 and exits.

It is to be understood that although this disclosure includes a detailed description on cloud computing, implementation of the teachings recited herein are not limited to a cloud computing environment. Rather, embodiments disclosed herein are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
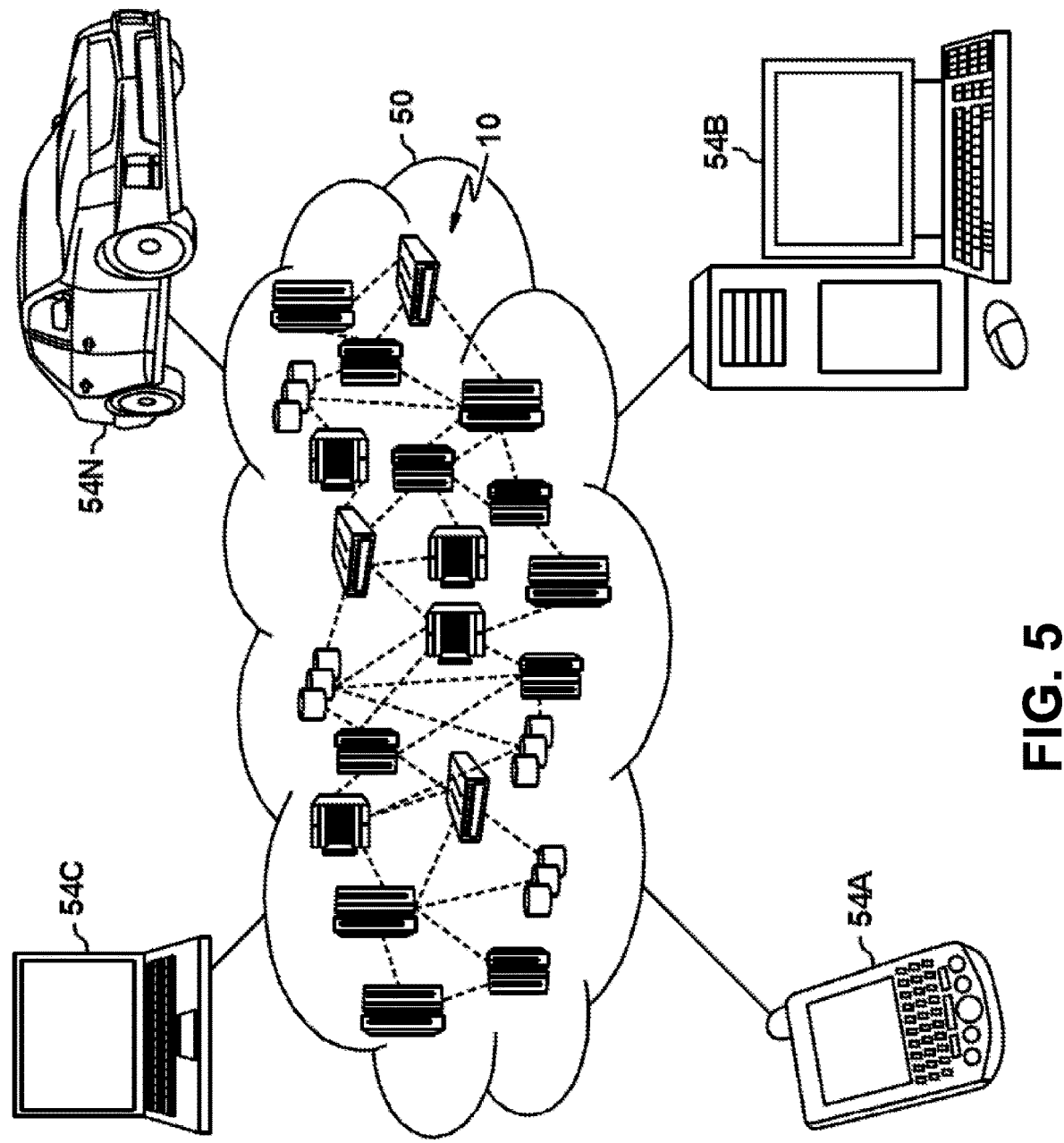
FIG. 5 depicts a cloud computing environment according to a particular aspect of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
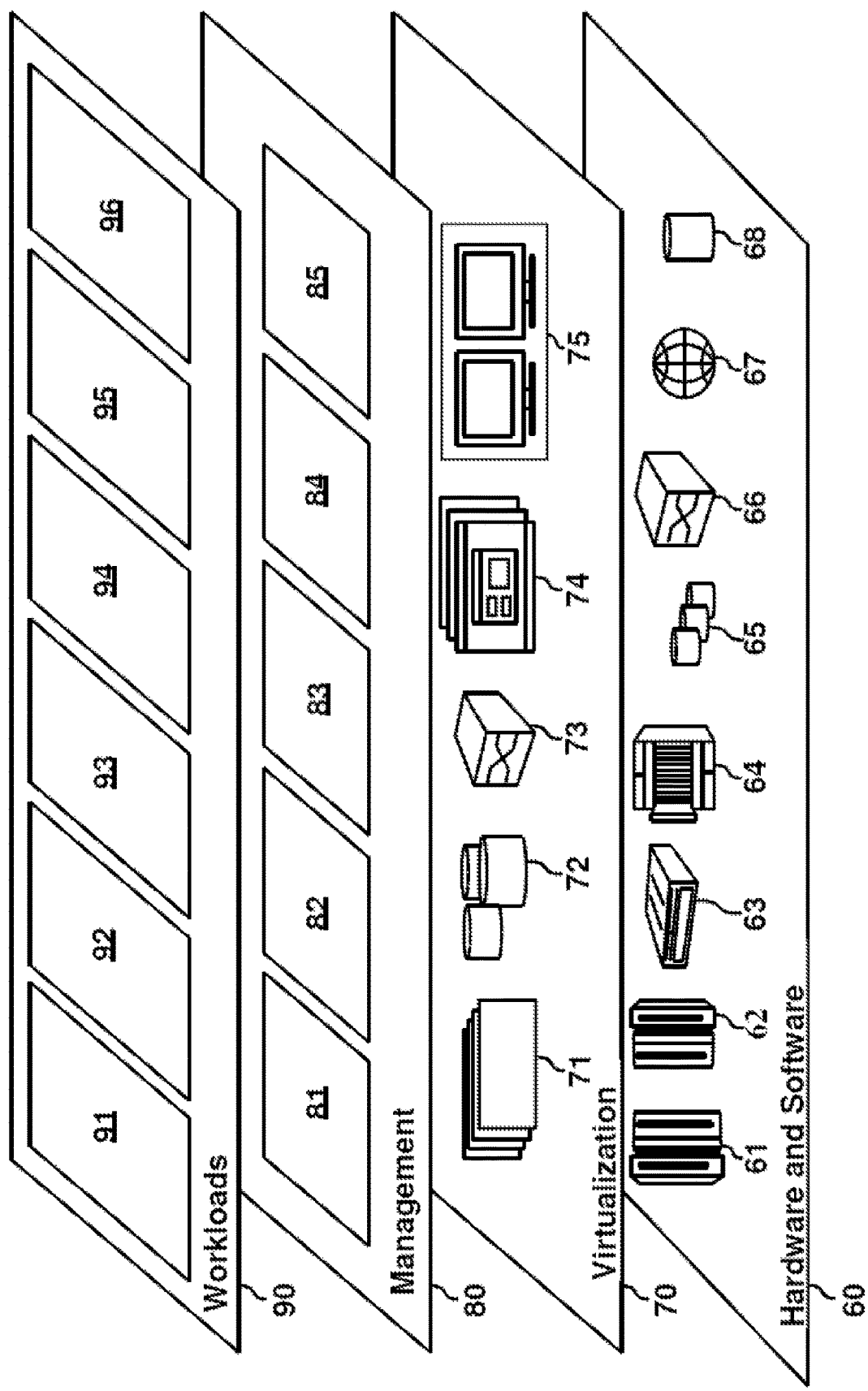
FIG. 6 depicts abstraction model layers according to a particular aspect of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing 96 associated with the text classification.

Figure 7:
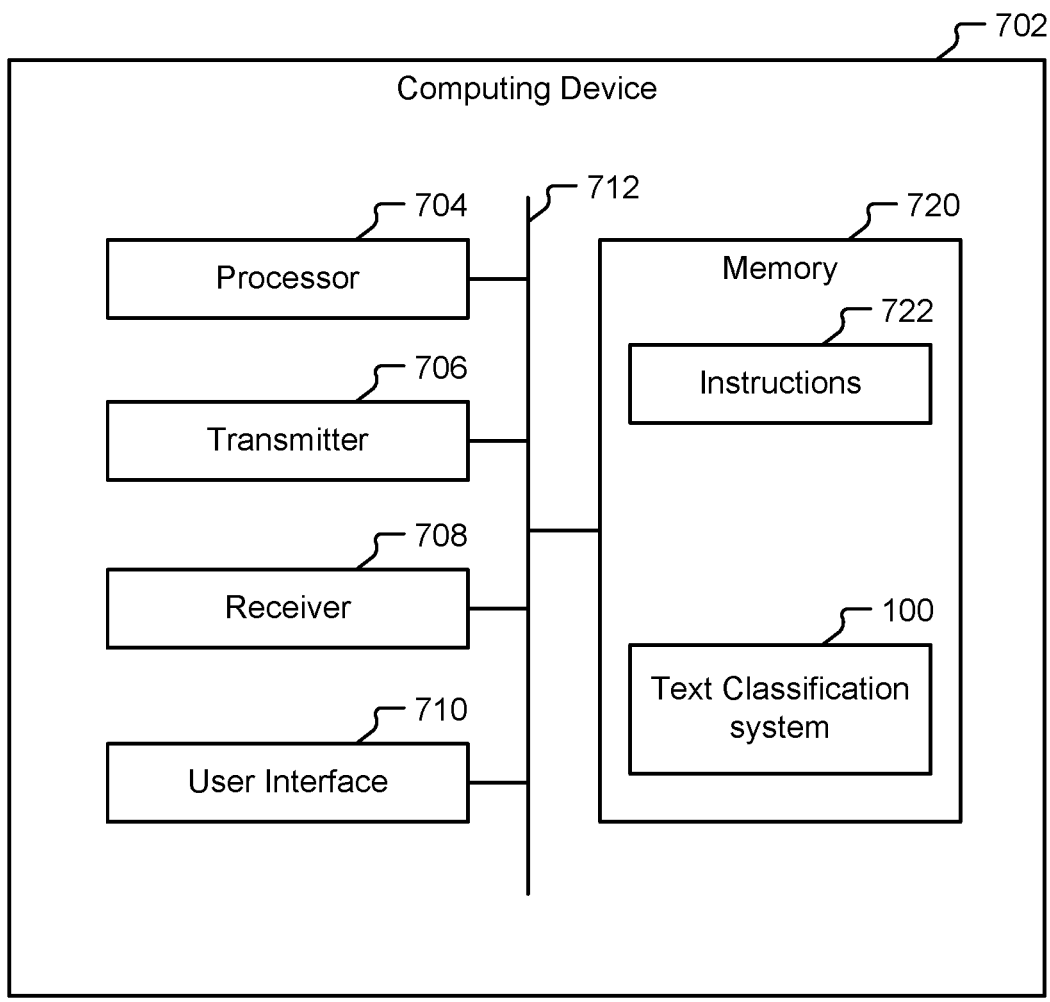
FIG. 7 illustrates a diagram of a computing device configured to assign classification labels to text according to a particular aspect of the present disclosure.

FIG. 7 illustrates a diagram of a computing device 702 configured to perform text classification according to a particular aspect of the present disclosure. The computing device 702 may include or correspond to a desktop computer, a laptop computer, a tablet computer, a server, a mainframe, or any other type of computing device.

The computing device includes a processor 704, a transmitter 706, a receiver 708, a user interface 710, and a memory 720. The processor 704, the transmitter 706, the receiver 708, the user interface 710, and the memory 720 may be coupled together via a bus 712 (or another connection). The example illustrated in FIG. 7 is not intended to be limiting, and in other implementations, one or more of the processor 704, the transmitter 706, the receiver 708, the user interface 710, the bus 712, and the memory 720 are optional, or more components may be included in the computing device 702.

The transmitter 706 is configured to enable the computing device 702 to send data to one or more other devices via direct connection or via one or more networks, and the receiver 708 is configured to enable the computing device 702 to receive data from one or more other devices via direct connection or via one or more networks. The one or more networks may include Institute of Electrical and Electronics Engineers (IEEE) 802 wireless networks, Bluetooth networks, telephone networks, optical or radio frequency networks, or other wired or wireless networks. In some implementations, the transmitter 706 and the receiver 708 may be replaced with a transceiver that enables sending and receipt of data from one or more other devices.

The user interface 710 is configured to facilitate user interaction. For example, the user interface 710 is adapted to receive input from a user, to provide output to a user, or a combination thereof. In some implementations, the user interface 710 conforms to one or more standard interface protocols, including serial interfaces (e.g., universal serial bus (USB) interfaces or IEEE interface standards), parallel interfaces, display adapters, audio adaptors, or custom interfaces. In some implementations, the user interface 710 is configured to communicate with one or more input/output devices, such as some combination of buttons, keyboards, pointing devices, displays, speakers, microphones, touch screens, and other devices.

The memory 720 includes volatile memory devices (e.g., random access memory (RAM) devices), nonvolatile memory devices (e.g., read-only memory (ROM) devices, programmable read-only memory, and flash memory), or both. The memory 720 is configured to store instructions 722. The processor 704 is configured to execute the instructions 722 to perform the operations described herein. To illustrate, the processor 704 may execute the instructions 722 to perform operations described with reference to the trained classification network 104 or portions thereof (e.g., the embedding layers 106 or the regression layer 108), to perform operations described with reference to the aggregation block 124, the comparison block 128, the element-by-element combination block 136, the normalizer block 140, the one-hot encoding block 144, or any combination thereof.

The various aspects disclosed herein may include a system, a method, and/or a computer program product at any possible technical detail level of integration. The computer program product may include a computer readable storage medium (or media) having computer readable program instructions thereon for causing a processor to carry out operations disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations disclosed herein may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform operations disclosed herein.

Various aspects of the present disclosure are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various aspects disclosed herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of assigning classification labels to text, the computer-implemented method comprising:
   generating, using embedding layers of a trained classification network, a text embedding vector representing a text sample;
   applying weights of a regression layer of the trained classification network to the text embedding vector to generate a first data model output vector, each value of the first data model output vector representative of a first estimate of a probability that the text sample is associated with a class indicated by a respective classification label of a plurality of classification labels;
   generating, based on training text samples associated with the plurality of classification labels, a plurality of prototype embedding vectors, each prototype embedding vector of the plurality of prototype embedding vectors associated with a respective classification label;
   comparing the plurality of prototype embedding vectors to the text embedding vector to generate a second data model output vector, each value of the second data model output vector representative of a second estimate of the probability that the text sample is associated with the class; and assigning a particular classification label of the plurality of classification labels to the text sample based on the first data model output vector, the second data model output vector, and one or more weighting values.

2. The computer-implemented method of claim 1, further comprising:
obtaining a plurality of training text samples including one or more representative training text samples for each class of a plurality of classes; and
generating, using the embedding layers, a plurality of training text embedding vectors including a training text embedding vector representing each representative training text sample of the plurality of training text samples,
wherein the plurality of prototype embedding vectors are generated using the plurality of training text embedding vectors.

3. The computer-implemented method of claim 2, further comprising determining, based on the text sample and the plurality of training text samples, a plurality of weighting values including the one or more weighting values.

4. The computer-implemented method of claim 2, wherein generating a prototype embedding vector corresponding to a particular class of the plurality of classes includes aggregating a set of training text embedding vectors corresponding to the particular class.

5. The computer-implemented method of claim 2, wherein the plurality of training text samples include or correspond to labeled training data used to train the trained classification network.

6. The computer-implemented method of claim 5, wherein training text samples representing each class of the plurality of classes are randomly or pseudo-randomly selected from a subset of the labeled training data representing the corresponding class.

7. The computer-implemented method of claim 1, further comprising:
combining, element-by-element, weighted values of the first data model output vector and the second data model output vector to generate a combined data model output vector; and
normalizing elements of the combined data model output vector to generate a combined probability estimate vector including a plurality of probability estimate elements, each probability estimate elements associated with a respective classification label of the plurality of classification labels,
wherein the particular classification label is assigned to the text sample based on a probability estimate element associated with the particular classification label having a highest combined probability estimate value among the plurality of probability estimate elements.

8. The computer-implemented method of claim 1, further comprising:
before generating the text embedding vector, receiving the text sample via a query input; and
determining the one or more weighting values based at least partially on the text sample.

9. A system for assigning classification labels to text, the system comprising:
one or more processors; and
one or more memory devices coupled to the one or more processors, the one or more memory devices storing instructions that are executable by the one or more processors to perform operations including:

generating, using embedding layers of a trained classification network, a text embedding vector representing a text sample;
applying weights of a regression layer of the trained classification network to the text embedding vector to generate a first data model output vector, each value of the first data model output vector representative of a first estimate of a probability that the text sample is associated with a class indicated by a respective classification label of a plurality of classification labels;
generating, based on training text samples associated with the plurality of classification labels, a plurality of prototype embedding vectors, each prototype embedding vector of the plurality of prototype embedding vectors associated with a respective classification label;
comparing the plurality of prototype embedding vectors to the text embedding vector to generate a second data model output vector, each value of the second data model output vector representative of a second estimate of the probability that the text sample is associated with the class; and
assigning a particular classification label of the plurality of classification labels to the text sample based on the first data model output vector, the second data model output vector, and one or more weighting values.

10. The system of claim 9, wherein the operations further comprise:
obtaining a plurality of training text samples including one or more representative training text samples for each class of a plurality of classes; and
generating, using the embedding layers, a plurality of training text embedding vectors including a training text embedding vector representing each representative training text sample of the plurality of training text samples,
wherein the plurality of prototype embedding vectors are generated using the plurality of training text embedding vectors.

11. The system of claim 10, wherein the operations further comprise determining, based on the text sample and the plurality of training text samples, a plurality of weighting values including the one or more weighting values.

12. The system of claim 10, wherein generating a prototype embedding vector corresponding to a particular class of the plurality of classes includes aggregating a set of training text embedding vectors corresponding to the particular class.

13. The system of claim 9, wherein the operations further comprise:
combining, element-by-element, weighted values of the first data model output vector and the second data model output vector to generate a combined data model output vector; and
normalizing elements of the combined data model output vector to generate a combined probability estimate vector including a plurality of probability estimate elements, each probability estimate element associated with a respective classification label of the plurality of classification labels,
wherein the particular classification label is assigned to the text sample based on a probability estimate element associated with the particular classification label having a highest combined probability estimate value among the plurality of probability estimate elements.

14. The system of claim 9, wherein the operations further comprise:
 before generating the text embedding vector, receiving the text sample via a query input; and
 determining the one or more weights based at least partially on the text sample.

15. A computer program product for assigning classification labels to text, the computer program product comprising a computer readable storage medium having program instructions embodied therewith, the program instructions executable by one or more processors to perform operations including:
 generating, using embedding layers of a trained classification network, a text embedding vector representing a text sample;
 applying weights of a regression layer of the trained classification network to the text embedding vector to generate a first data model output vector, each value of the first data model output vector representative of a first estimate of a probability that the text sample is associated with a class indicated by a respective classification label of a plurality of classification labels;
 generating, based on training text samples associated with the plurality of classification labels, a plurality of prototype embedding vectors, each prototype embedding vector of the plurality of prototype embedding vectors associated with a respective classification label;
 comparing the plurality of prototype embedding vectors to the text embedding vector to generate a second data model output vector, each value of the second data model output vector representative of a second estimate of the probability that the text sample is associated with the class; and
 assigning a particular classification label of the plurality of classification labels to the text sample based on the first data model output vector, the second data model output vector, and one or more weighting values.

16. The computer program product of claim 15, wherein the operations further comprise:
 obtaining a plurality of training text samples including one or more representative training text samples for each class of a plurality of classes; and
 generating, using the embedding layers, a plurality of training text embedding vectors including a training text embedding vector representing each representative training text sample of the plurality of training text samples,
 wherein the plurality of prototype embedding vectors are generated using the plurality of training text embedding vectors.

17. The computer program product of claim 16, wherein the operations further comprise determining, based on the text sample and the plurality of training text samples, a plurality of weighting values including the one or more weighting values.

18. The computer program product of claim 16, wherein generating a prototype embedding vector corresponding to a particular class of the plurality of classes includes aggregating a set of training text embedding vectors corresponding to the particular class.

19. The computer program product of claim 15, wherein the operations further comprise:
 combining, element-by-element, weighted values of the first data model output vector and the second data model output vector to generate a combined data model output vector; and
 normalizing elements of the combined data model output vector to generate a combined probability estimate vector including a plurality of probability estimate element, each probability estimate element associated with a respective classification label of the plurality of classification labels,
 wherein the particular classification label is assigned to the text sample based on a probability estimate element associated with the particular classification label having a highest combined probability estimate value among the plurality of probability estimate elements.

20. The computer program product of claim 15, wherein the operations further comprise:
 before generating the text embedding vector, receiving the text sample via a query input; and
 determining the one or more weights based at least partially on the text sample.

* * * * *